(12) United States Patent
Kang et al.

(10) Patent No.: US 11,217,858 B2
(45) Date of Patent: Jan. 4, 2022

(54) BATTERY PACK HAVING IMPROVED STABILITY

(71) Applicant: LG CHEM, LTD., Seoul (KR)

(72) Inventors: Gyung-Soo Kang, Daejeon (KR); Yong-Il Kim, Daejeon (KR); Jin-Moo Nam, Daejeon (KR); Seung-Yoon Lee, Daejeon (KR); Jong-Hyun Jo, Daejeon (KR); Yong-Seok Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 35 days.

(21) Appl. No.: 16/618,976

(22) PCT Filed: Oct. 26, 2018

(86) PCT No.: PCT/KR2018/012850
§ 371 (c)(1),
(2) Date: Dec. 3, 2019

(87) PCT Pub. No.: WO2019/117455
PCT Pub. Date: Jun. 20, 2019

(65) Prior Publication Data
US 2020/0176741 A1 Jun. 4, 2020

(30) Foreign Application Priority Data
Dec. 15, 2017 (KR) .......................... 10-2017-0173488

(51) Int. Cl.
*H01M 2/12* (2006.01)
*H01M 10/48* (2006.01)
(Continued)

(52) U.S. Cl.
CPC ....... *H01M 50/375* (2021.01); *H01M 10/488* (2013.01); *H01M 10/613* (2015.04); *H01M 10/6562* (2015.04)

(58) Field of Classification Search
None
See application file for complete search history.

(56) References Cited

U.S. PATENT DOCUMENTS 6,212,959 B1 * 4/2001 Perkins .................. G01F 1/115
73/861.74
6,372,378 B1 * 4/2002 Warner ................. H01M 10/02
429/120
(Continued)

FOREIGN PATENT DOCUMENTS

JP 2005-197133 A 7/2005
JP 2006-210190 A 8/2006
(Continued)

OTHER PUBLICATIONS

"Member" definition provided by Oxford English Dictionary—https://www.lexico.com/en/definition/member accessed Mar. 2021 (Year: 2021).*

(Continued)

*Primary Examiner* — Amanda J Barrow
(74) *Attorney, Agent, or Firm* — Birch, Stewart, Kolasch & Birch, LLP (57) ABSTRACT

A battery pack including at least one battery cell; a pack case configured to accommodate the battery cell and having a cooling hole formed therethrough; a flow meter provided at an outer side of the pack case and disposed adjacent to the cooling hole; and an opening and closing unit configured to open or close the cooling hole according to a temperature change inside the pack case.

12 Claims, 9 Drawing Sheets

(51) Int. Cl.
   *H01M 10/613*   (2014.01)
   *H01M 10/6562*  (2014.01)
   *H01M 50/375*   (2021.01)

(56) References Cited

U.S. PATENT DOCUMENTS

| | | | |
|---|---|---|---|
| 7,172,831 B2* | 2/2007 | Jaura | H01M 10/6565 429/72 |
| 9,093,728 B2* | 7/2015 | Alkemade | H01M 10/6563 |
| 9,261,926 B2* | 2/2016 | Larsen | G06F 1/20 |
| 10,396,379 B2 | 8/2019 | Ha | |
| 2004/0061480 A1* | 4/2004 | Kimura | H01M 10/6557 320/150 |
| 2006/0172188 A1 | 8/2006 | Okuda et al. | |
| 2009/0234532 A1* | 9/2009 | Yoon | H01M 10/625 701/29.5 |
| 2012/0155025 A1* | 6/2012 | Bourgeois | H01M 10/399 361/694 |
| 2013/0017419 A1 | 1/2013 | Jin | |
| 2013/0071706 A1* | 3/2013 | Lee | H01M 10/6563 429/62 |
| 2014/0349206 A1 | 11/2014 | Lee et al. | |
| 2015/0171486 A1* | 6/2015 | Rawlinson | H01M 10/613 324/426 |
| 2015/0333379 A1* | 11/2015 | Janarthanam | H01M 10/48 429/61 |

FOREIGN PATENT DOCUMENTS

| | | |
|---|---|---|
| JP | 2006-252785 A | 9/2006 |
| JP | 5589016 B2 | 9/2014 |
| JP | 2016-201333 A | 12/2016 |
| KR | 10-2012-0015799 A | 2/2012 |
| KR | 10-2013-0031532 A | 3/2013 |
| KR | 10-1352320 B1 | 1/2014 |
| KR | 10-2014-0038843 A | 3/2014 |
| KR | 10-1369323 B1 | 3/2014 |
| KR | 10-1619531 B1 | 5/2016 |
| KR | 10-1621880 B1 | 5/2016 |
| KR | 10-2016-0067601 A | 6/2016 |
| KR | 10-1734689 B1 | 5/2017 |
| KR | 10-2017-0120440 A | 10/2017 |

OTHER PUBLICATIONS

"Unit" definition provided by Oxford English Dictionary—https://www.lexico.com/en/definition/unit accessed Mar. 2021 (Year: 2021).*
Extended European Search Report for European Application No. 18889677.3, dated Oct. 15, 2020.
International Search Report (PCT/ISA/210) issued in PCT/KR2018/012850, dated Feb. 19, 2019.

* cited by examiner

FIG. 1

Prior Art

BATTERY PACK HAVING IMPROVED STABILITY

TECHNICAL FIELD

The present disclosure relates to a battery pack with improved safety, and more particularly, to a battery pack configured to detect that a temperature in the battery pack rises over a reference value and then to isolate the battery pack from the outside and give an alarm to a user so that the user may recognize the abnormal situation.

The present application claims priority to Korean Patent Application No. 10-2017-0173488 filed on Dec. 15, 2017 in the Republic of Korea, the disclosures of which are incorporated herein by reference.

BACKGROUND ART

As portable electric products such as video cameras, cellular phones and portable PCs are used more broadly, the importance of secondary batteries mainly used as a driving power source therefor is increasing.

A secondary battery capable of charging and discharging, different from a primary battery cannot be recharged is being actively studied in high-tech fields such as digital cameras, cellular phones, laptop computers, power tools, electric bicycles, electric vehicles, hybrid electric vehicles and mass-capacity power storage devices.

In particular, a lithium secondary battery has a high energy density per unit weight and allows rapid charging, compared to other secondary batteries such as lead storage batteries, nickel-cadmium batteries, nickel-hydrogen batteries and nickel-zinc batteries, and thus it is used more and more.

The lithium secondary battery has an operating voltage of 3.6V or above. The lithium secondary battery is used as a power source for a portable electronic device, or a plurality of lithium secondary batteries are connected in series or in parallel and used for a high output electric vehicle, a hybrid electric vehicle, a power tool, an electric bicycle, an energy storage system (ESS) or a UPS.

The lithium secondary battery has an operating voltage three times higher than that of a nickel-cadmium battery or a nickel-metal hydride battery and has a high energy density per unit weight. For this reason, the lithium secondary battery tends to be used more and more.

The lithium secondary battery may be classified into a lithium ion battery using a liquid electrolyte and a lithium ion polymer battery using a polymer solid electrolyte depending on an electrolyte type. In addition, the lithium ion polymer battery may be classified into a pure solid lithium ion polymer battery without containing any electrolyte and a lithium ion polymer battery using a gel polymer electrolyte containing an electrolytic solution, depending on a polymer solid electrolyte type.

In the lithium ion battery using a liquid electrolyte, a cylindrical or rectangular metal can is generally used as a container in a welded and sealed form. Since the can-type secondary battery using the metal can as a container has a fixed shape, there is a disadvantage that it restricts the design of an electric product using the can-type secondary battery as a power source, and it is difficult to reduce the volume. Thus, a pouch-type secondary battery prepared by putting an electrode assembly and an electrolyte in a pouch packaging material made of a film and sealing the pouch packaging material has been developed and used.

However, the lithium secondary battery has a risk of explosion when being overheated and thus it is important to secure safety. The lithium secondary battery is overheated due to various factors, one of which is an overcurrent flow above a limit through the lithium secondary battery. If the overcurrent flows, the lithium secondary battery is heated by the Joule heat, so the internal temperature of the battery rises rapidly. In addition, the rapid rise in temperature causes a decomposition reaction of the electrolyte, causing a thermal runaway, which eventually leads to the explosion of the battery. Overcurrent occurs in the case where a sharp metal object penetrates the lithium secondary battery, where the insulation between positive and negative electrodes is destroyed due to the shrinkage of a separator interposed between the positive and negative electrodes, where a rush current is applied to the battery due to abnormality of a charging circuit or a load connected to the outside, or the like. In particularly, in case of an electric vehicle, the battery is installed below a seat, which may make it difficult to detect swelling of the battery cell and thus lead to injury of persons.

Thus, the lithium secondary battery is used in combination with a protecting circuit in order to protect the battery against an abnormal situation such as overcurrent, and the protecting circuit generally includes a fuse element for irreversibly disconnecting a line through which a charging or discharging current flows when overcurrent occurs.

Figure 1:
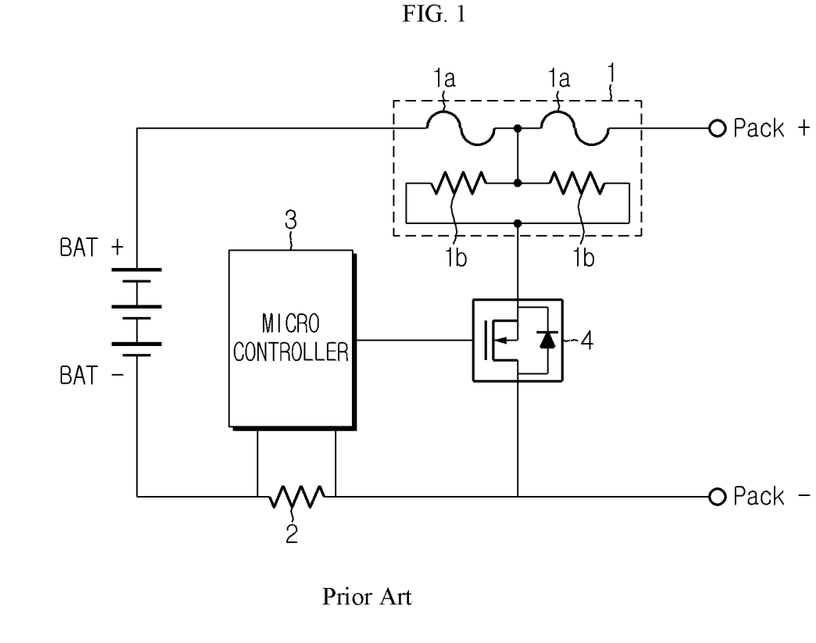
FIG. 1 is a circuit diagram for illustrating an arrangement and an operating mechanism of a fuse element provided in a protecting circuit coupled to a battery module.

FIG. 1 is a circuit diagram for illustrating an arrangement and an operating mechanism of a fuse element provided in a protecting circuit coupled to a battery pack including a lithium secondary battery.

As shown in FIG. 1, in order to protect the battery pack when overcurrent occurs, the protecting circuit includes a fuse element 1, a sensing resistor 2 for sensing overcurrent, a microcontroller 3 for monitoring the occurrence of overcurrent and operating the fuse element 1 when overcurrent occurs, and a switch 4 for switching the inflow of an operating current to the fuse element 1.

The fuse element 1 is installed on a main line connected to an outermost terminal of the battery pack. The main line refers to a wiring through which a charging current or a discharging current flows. In FIG. 1, it is depicted that the fuse element 1 is installed at a high-potential line (Pack+).

The fuse element 1 is a three-terminal element, where two terminals are connected to the main line through which a charging or discharging current flows and one terminal is connected to the switch 4. In addition, the fuse element 1 includes a fuse 1a connected to the main line in series and melted and cut at a certain temperature and a resistor 1b for applying heat to the fuse 1a.

The microcontroller 3 periodically detects the voltage at both ends of the sensing resistor 2 and monitors whether overcurrent occurs. If it is determined that overcurrent occurs, the microcontroller 3 turns on the switch 4. If so, the current flowing on the main line is bypassed to the fuse element 1 and applied to the resistor 1b. Accordingly, the Joule heat generated at the resistor 1b is conducted to the fuse 1a to raise the temperature of the fuse 1a. If the temperature of the fuse 1a rises to the melting temperature, the fuse 1a is melted and broken so that the main line is irreversibly disconnected. If the main line is disconnected, the overcurrent does not flow any more, thereby overcoming the problem caused by the overcurrent.

However, the above conventional technique has several problems. In other words, if the microcontroller 3 is broken, the switch 4 does not turn on even though overcurrent occurs. In this case, a current does not flow into the resistor 1b of the fuse element 1, and thus the fuse element 1 does not operate. Also, a space for disposing the fuse element 1 is separately required inside the protecting circuit, and a program algorithm for controlling the operation of the fuse element 1 must be loaded in the microcontroller 3. Thus, it is disadvantageous that the space efficiency of the protecting circuit is deteriorated and the load of the microcontroller 3 is increased.

DISCLOSURE

Technical Problem

The present disclosure is designed to solve the problems of the related art, and therefore the present disclosure is directed to providing a battery pack, which is configured to greatly improve the safety in the use of a secondary battery by preventing the occurrence of an event such as ignition without deteriorating the energy density of battery cells.

However, the technical problem to be solved by the present disclosure is not limited to the above, and other objects not mentioned herein will be understood from the following description by those skilled in the art.

Technical Solution

In one aspect of the present disclosure, there is provided a battery pack, comprising: at least one battery cell; a pack case configured to accommodate the battery cell and having a cooling hole formed therethrough; a flow meter provided at an outer side of the pack case and disposed adjacent to the cooling hole; and an opening and closing unit configured to open or close the cooling hole according to a temperature change inside the pack case.

The flow meter may sense flow of air that flows from inside of the pack case to outside of the pack case.

The flow meter may generate an alarm when the flow meter senses that the flow of air is blocked.

The battery pack may further comprise an alarm device configured to generate an alarm when the flow meter senses that the flow of air is blocked. Namely, the flow meter may have only a function of sensing whether air flows or not, and a device for generating an alarm may be provided separately.

The opening and closing unit may include a hole cap having a size and shape corresponding to the cooling hole; a vertical rod connected to the hole cap; and at least one bimetal configured to deform in shape when the temperature inside the pack case rises over a reference temperature so that the vertical rod is moved downward, whereby the hole cap is moved downward to close the cooling hole.

The opening and closing unit may further include a first bimetal curved to be convex upward when the temperature rises, the first bimetal having a perforation hole through which the vertical rod is provided; a second bimetal located below the first bimetal and coupled to the vertical rod, the second bimetal being curved to be convex downward when the temperature rises; and a stopper located above the first bimetal to restrict the upward movement of the first bimetal.

The opening and closing unit may further include an elastic member located below the second bimetal to elastically support the second bimetal upward.

The opening and closing unit may include one bimetal coupled to the vertical rod and curved to be convex downward when the temperature rises, and a stopper located above the one bimetal to restrict the upward movement of the one bimetal.

The opening and closing unit may include a hole cap having a size and shape corresponding to the cooling hole; a vertical rod having a first end connected to the hole cap; a horizontal rod extending in a direction perpendicular to the vertical rod and having a first end connected to a second end of the vertical rod; and at least one bimetal configured to deform a shape when the temperature inside the pack case rises over a reference temperature so that the horizontal rod is moved in a direction away from the vertical rod, whereby the hole cap connected to the vertical rod is moved downward to close the cooling hole.

The opening and closing unit may further include a first bimetal curved to be convex toward the vertical rod when the temperature rises, the first bimetal having a perforation hole through which the horizontal rod is provided; a second bimetal located adjacent to the first bimetal and fixed to the other end of the horizontal rod provided through the perforation hole; and a stopper located between the vertical rod and the first bimetal to restrict the movement of the first bimetal toward the vertical rod.

The opening and closing unit may further include an elastic member configured to elastically support the second bimetal toward the first bimetal.

The opening and closing unit may further include one bimetal coupled to the other end of the horizontal rod and curved to be convex in a direction away from the vertical rod when the temperature rises, and a stopper located between the vertical rod and the one bimetal to restrict the movement of the one bimetal toward the vertical rod.

Advantageous Effects

According to an embodiment of the present disclosure, since a user may detect an abnormal symptom before the occurrence of an event such as ignition of a battery pack, it is possible to secure the safety in using a secondary battery.

According to another embodiment of the present disclosure, when the risk of ignition event in the battery pack increases, the battery pack is completely isolated from the outside, so that the supply of oxygen introduced to the inside is blocked and the flame is prevented from flowing to the outside, thereby securing the safety.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure. For example, a vertical rod may be provided to pass through a bimetal or not to pass through the bimetal.

The structure of a battery pack according to an embodiment of the present disclosure will be described with reference to FIGS. 2 to 4.

Figure 2:
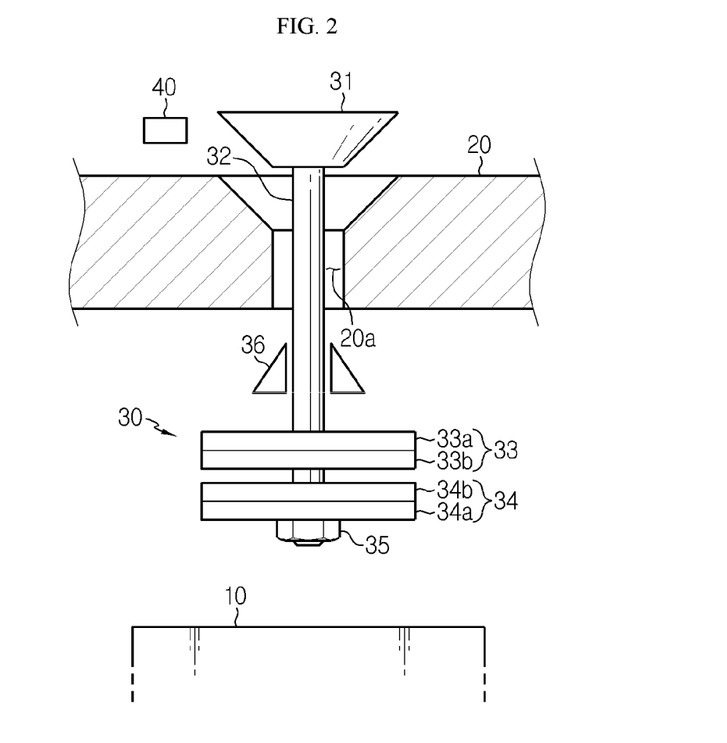
FIG. 2 is a diagram showing a battery pack according to an embodiment of the present disclosure.
Figure 3:
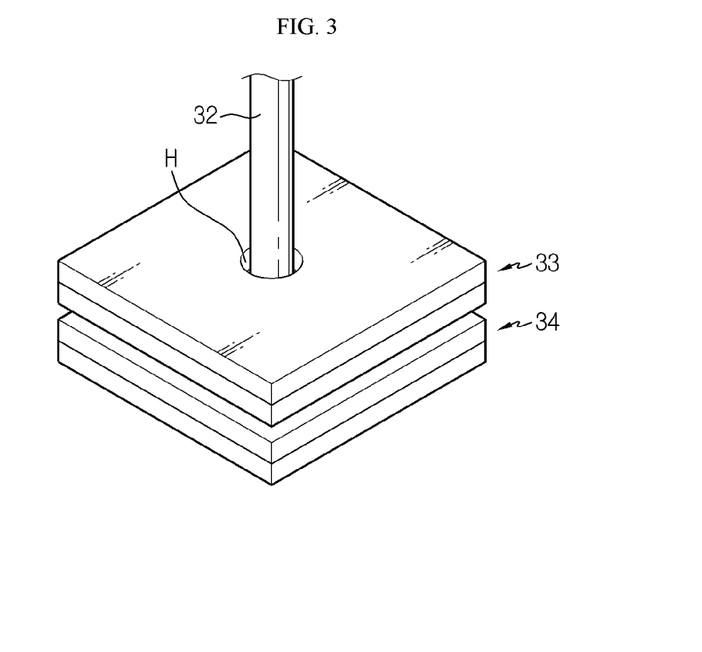
FIG. 3 is a diagram showing that a vertical rod is provided through a first bimetal, at an opening and closing unit depicted in FIG. 2.
Figure 4:
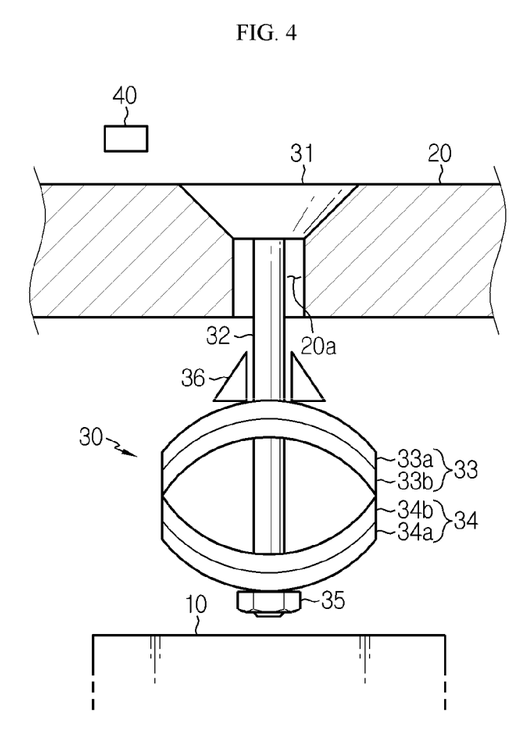
FIG. 4 is a diagram showing that a cooling hole is closed as the temperature rises, at the battery pack according to the embodiment depicted in FIG. 2.

FIG. 2 is a diagram showing a battery pack according to an embodiment of the present disclosure, FIG. 3 is a diagram showing that a vertical rod is provided through a first bimetal, at an opening and closing unit depicted in FIG. 2, and FIG. 4 is a diagram showing that a cooling hole is closed as the temperature rises, at the battery pack according to the embodiment depicted in FIG. 2.

Referring to FIGS. 2 to 4, the battery pack according to an embodiment of the present disclosure may be implemented to include at least one battery cell 10, a pack case 20 for accommodating the battery cell 10, an opening and closing unit 30 for opening or closing the pack case 20 according to a temperature change inside the pack case 20 so that the pack case 20 communicates with the outside or not, and a flow meter 40 for sensing whether air flows out of the pack case 20.

The battery cell 10 is be provided in any kind and in any number. One battery cell 10 may be accommodated in the pack case 20, and two or more battery cells 10 may be accommodated in the pack case 20 in a state of being connected in series or in parallel or in a combination thereof.

Also, as the number of the battery cells 10 accommodated in the pack case 20 increases, the amount of heat generated in the pack case 20 increases, and thus the necessity of applying the opening and closing unit 30 of the present disclosure becomes greater.

The pack case 20 accommodating at least one battery cell 10 further includes a space for accommodating the opening and closing unit 30, explained later, in addition to the space for accommodating the battery cell 10.

The pack case 20 has at least one cooling hole 20a formed therethrough. The cooling hole 20a functions as a passage through which hot air heated the heat generated at the battery cell 10 flows to the outside. In this way, the battery pack may be cooled.

The cooling hole 20a may have an inlet that is narrowed from the outside to the inside of the pack case 20 so that a hole cap 31 of the opening and closing unit 30, explained later, may be stably coupled onto the inner surface of the cooling hole 20a. If the cooling hole 20a has an inlet narrowed from the outside to the inside and the hole cap 31, explained later, is shaped to be matched therewith as described above, the hole cap 31 may be more easily coupled to the inner surface of the cooling hole 20a.

Meanwhile, the cooling hole 20a may be formed in plural. In this case, the opening and closing unit 30 is provided as many as the number of the cooling holes 20a, and all the cooling holes 20a are opened or closed according to a temperature change.

The opening and closing unit 30 is installed at a position corresponding to the cooling hole 20a to open or close the cooling hole 20a according to a temperature change inside the pack case 20. That is, the opening and closing unit 30 operates to close the cooling hole 20a if the temperature inside the pack case 20 rises, and operates to open the cooling hole 20a if the temperature inside the pack case 20 falls.

For this operation, the opening and closing unit 30 applied to the battery pack according to an embodiment of the present disclosure may be implemented to include a hole cap 31, a vertical rod 32, a first bimetal 33, a second bimetal 34 and a stopper 36. In addition, the opening and closing unit 30 may further include a fixing member 35 such as a bolt to fix the second bimetal 34 to the vertical rod 32.

The hole cap 31 is located at the outside of the battery pack and is sized and shaped to be matched with the cooling hole 20a as described above. That is, the hole cap 31 may have a substantially inverted trapezoidal shape in which its width becomes narrower from an upper portion to a lower portion.

The hole cap 31 closes or opens the cooling hole 20a as the vertical rod 32 moves due to the deformation of the bimetals 33, 34. The hole cap 31 may be made of elastic material such as rubber since the hole cap 31 functions to seal the cooling hole 20a by closing.

The vertical rod 32 has a long rod shape extending in a vertical direction. One end of the vertical rod 32 is connected to the hole cap 31 through the cooling hole 20a, and the other end of the vertical rod 32 is fixed to the second bimetal 34 through the first bimetal 33. Here, the vertical direction means an upper and lower direction, based on FIG. 2.

Each of the bimetals 33, 34 is formed by bonding a pair of metal plates with different thermal expansion rates and is located inside the pack case 20. Thus, if the temperature rises above a reference value due to the heating of the battery cell 10, each of the bimetals 33, 34 is curved to be convex toward a metal plate with a greater thermal expansion rate.

In the present disclosure, in the case of the first bimetal 33, a first metal plate 33a with a relatively higher thermal expansion rate is disposed at the top and a second metal plate 33b with a relatively smaller thermal expansion rate is disposed at the bottom. Also, the two metal plates 33a, 33b are contacted and adhered to each other. As the temperature inside the pack case 20 rises, the first bimetal 33 deforms its shape so that its center portion is curved to be convex upward, namely toward the cooling hole 20a.

In addition, in the case of the second bimetal 34, as opposed to the first bimetal 33, a third metal plate 34a with a relatively higher thermal expansion rate is disposed at the top, and a fourth metal plate 34b with a relatively smaller thermal expansion rate is disposed at the bottom. Also, two metal plates 34a, 34b are contacted and adhered to each other. As the temperature inside the pack case 20 rises, the second bimetal 34 deforms its shape so that its center portion is curved to be convex downward, namely in a direction away from the cooling hole 20a, as opposed to the first bimetal 33.

Since the second bimetal 34 is connected and fixed to an end of the vertical rod 32, the vertical rod 32 is moved downward according to the shape change of the second bimetal 34. Also, the stopper 36 is fixed and disposed between the cooling hole 20a and the first bimetal 33. Accordingly, if the first bimetal 33 deforms its shape, the first bimetal 33 is caught by the stopper 36, and the first bimetal 33 pushes the second bimetal 34 downward due to its reaction.

Thus, the vertical rod 32 moves downward by a distance corresponding to the sum of displacements of the first bimetal 33 and the second bimetal 34, and thus the hole cap 31 connected and fixed to one end of the vertical rod 32 is moved downward to close the cooling hole 20a.

Meanwhile, though not shown in the figures, an elastic member may be additionally applied to a lower portion of the vertical rod 32 to elastically support the lower portion of the vertical rod 32. In this case, when the shape deformation of the bimetals 33, 34 due to the temperature rise does not occur, the elastic member prevents the vertical rod 32 from drooping, thereby keeping the cooling hole 20a in an opened state.

The flow meter 40 is installed at an outer side of the pack case 20 and is disposed adjacent to the inlet of the cooling hole 20a to sense a flow rate of the air flowing between the cooling hole 20a and the outside. If the cooling hole 20a is closed by the shape deformation of the bimetals 33, 34 as described above, the flow meter 40 senses that there is no flow of air. At this time, the flow meter 40 may directly generate an alarm to notify this situation to a user. Alternatively, the flow meter 40 may transmit the information on the sensed flow rate to an alarm device (not shown) separately provided so that the alarm device generates an alarm.

As described above, in the battery pack according to an embodiment of the present disclosure, sufficient displacement are generated using two bimetals 33, 34 so that the cooling hole 20a may be quickly and reliably closed when the temperature inside the battery pack rises. Also, the change of flow rate according thereto is sensed and an alarm is generated to notify the abnormal temperature rise to the user rapidly, thereby securing the safety in the use of the battery pack.

Next, a battery pack according to another embodiment of the present disclosure, which is implemented in a mode different from the former embodiment, will be described with reference to FIGS. 5 and 6.

Figure 5:
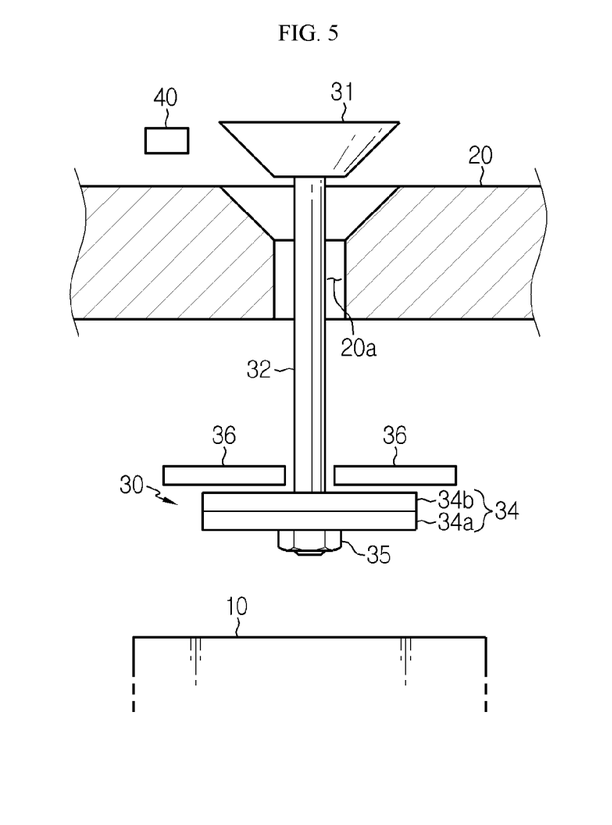
FIG. 5 is a diagram showing a battery pack according to another embodiment of the present disclosure.
Figure 6:
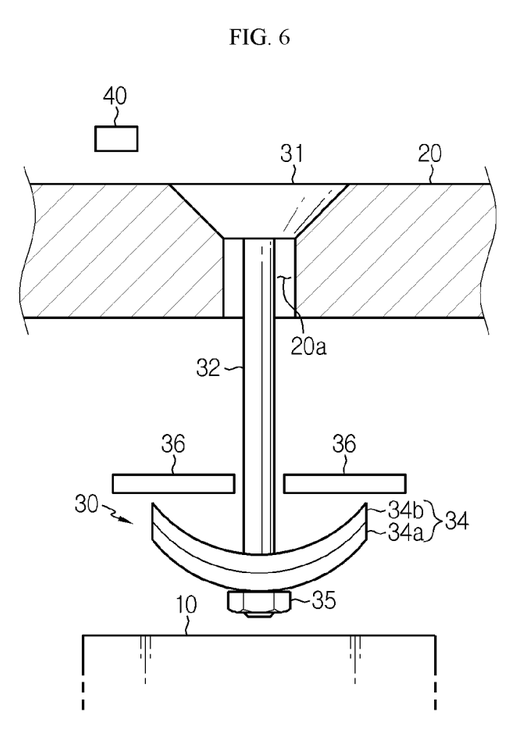
FIG. 6 is a diagram showing that the cooling hole is closed as the temperature rises, at the battery pack according to the embodiment depicted in FIG. 5.

FIG. 5 is a diagram showing a battery pack according to another embodiment of the present disclosure, and FIG. 6 is a diagram showing that the cooling hole is closed as the temperature rises, at the battery pack according to the embodiment depicted in FIG. 5.

The battery pack according to the embodiment depicted in FIGS. 5 and 6 is substantially identical to that of the former embodiment, except that only one bimetal 34 is applied instead of two bimetals. Thus, in the description of the battery pack according to the embodiment depicted in FIGS. 5 and 6, the feature identical to the former embodiment will not be described in detail, and only a different feature will be described intensively.

Referring to FIGS. 5 and 6, in the battery pack according to another embodiment of the present disclosure, the upward movement of the bimetal 34 is restricted by a stopper 36 located above the bimetal 34 and directly or indirectly fixed to the inside of the pack case 20.

In addition, in the bimetal 34, the third metal plate 34a located at the bottom has a relatively higher thermal expansion rate compared to the fourth metal plate 34b adhered thereon. Thus, as the temperature inside the pack case 20 rises, the bimetal 34 deforms its shape so that its central portion is curved to be convex downward.

At this time, since the central portion of the bimetal 34 is connected and fixed to an end of the vertical rod 32, as the bimetal 34 is bent, the vertical rod 32 is also moved downward, and accordingly the hole cap 31 connected and fixed to one end of the vertical rod 32 is moved downward to close the cooling hole 20a.

As described above, the battery pack according to another embodiment of the present disclosure, which is configured different from the former embodiment, may secure the safety in the use of a secondary battery with a simpler structure since only one bimetal is used.

Next, a battery pack according to still another embodiment of the present disclosure, which is implemented in a mode different from the former two embodiments, will be described with reference to FIGS. 7 and 8.

Figure 7:
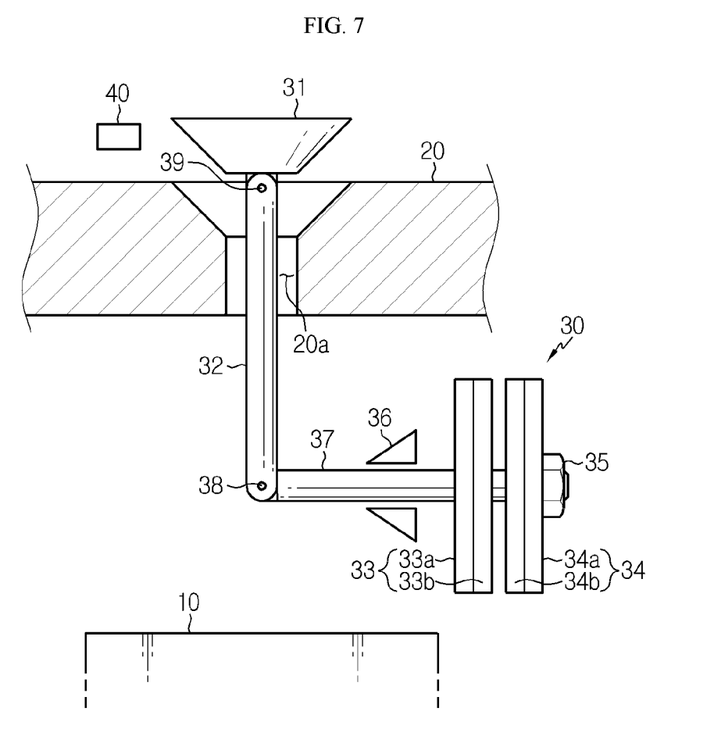
FIG. 7 is a diagram showing a battery pack according to still another embodiment of the present disclosure.
Figure 8:
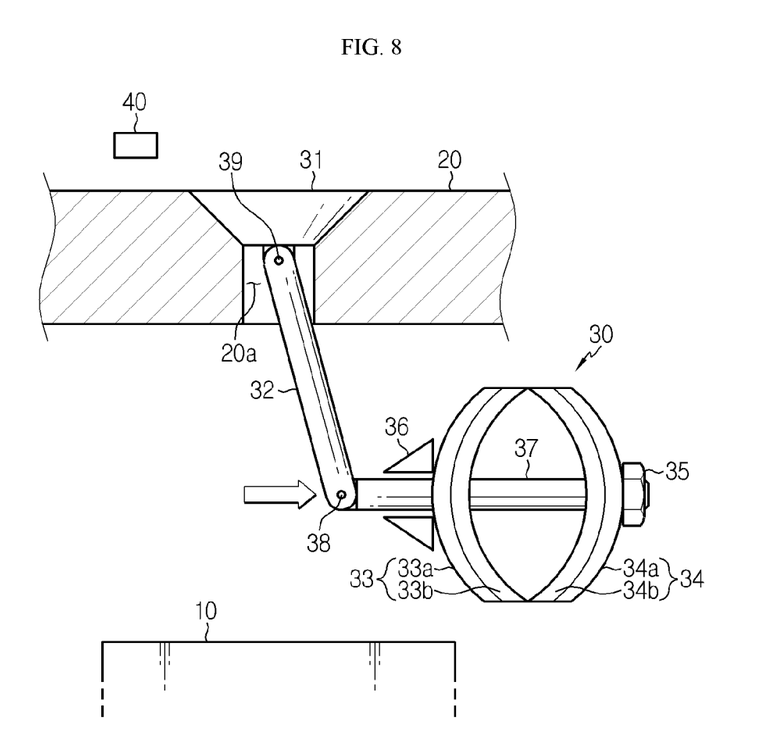
FIG. 8 is a diagram showing that the cooling hole is closed as the temperature rises, at the battery pack according to the embodiment depicted in FIG. 7.

FIG. 7 is a diagram showing a battery pack according to still another embodiment of the present disclosure, and FIG. 8 is a diagram showing that the cooling hole is closed as the temperature rises, at the battery pack according to the embodiment depicted in FIG. 7.

The battery pack according to still another embodiment of the present disclosure as depicted in FIGS. 7 and 8 is substantially identical to that of the former embodiment depicted in FIGS. 2 to 4, except that a horizontal rod 37 and joints 38, 39 are applied. Thus, in the description of the battery pack according to still another embodiment of the present disclosure as depicted in FIGS. 7 and 8, the feature identical to the former embodiments will not be described in detail, and only a different feature will be described intensively.

Referring to FIGS. 7 and 8, in the battery pack according to still another embodiment of the present disclosure, one end of the horizontal rod 37 is fastened to a lower end of the vertical rod 32. At this time, the horizontal rod 37 and the vertical rod 32 may be fastened by a rod joint 38 so as to be rotatable relative to each other.

Meanwhile, an upper end of the vertical rod 32 is fastened to the hole cap 31. At this time, the vertical rod 32 and the hole cap 31 may also be fastened by a cap joint 39 so as to be rotatable relative to each other.

The horizontal rod 37 is a long rod-shaped component extending along a direction perpendicular to the extending direction of the vertical rod 32. When the bimetals 33, 34 deform their shapes due to the temperature rise inside the pack case 20, the horizontal rod 37 is moved in a direction away from the vertical rod 32. If the horizontal rod 37 moves away from the vertical rod 32 as described above, the lower end of the vertical rod 32 also moves in the same direction, and accordingly the hole cap 31 pivotally coupled to the upper end of the vertical rod 32 is moved downward to close the cooling hole 20a.

As described above, in the battery pack according to still another embodiment of the present disclosure, due to the horizontal rod 37 connected and fixed to the second bimetal 34 through the first bimetal 33, it is possible to close the cooling hole 20a by converting a horizontal force into a vertical direction, thereby minimizing the space between the cooling hole 20a and the battery cell 10. Thus, it is possible to increase the energy density of the battery pack.

Next, a battery pack according to still another embodiment of the present disclosure, which is implemented in a mode different from the former embodiments, will be described with reference to FIGS. 9 and 10.

Figure 9:
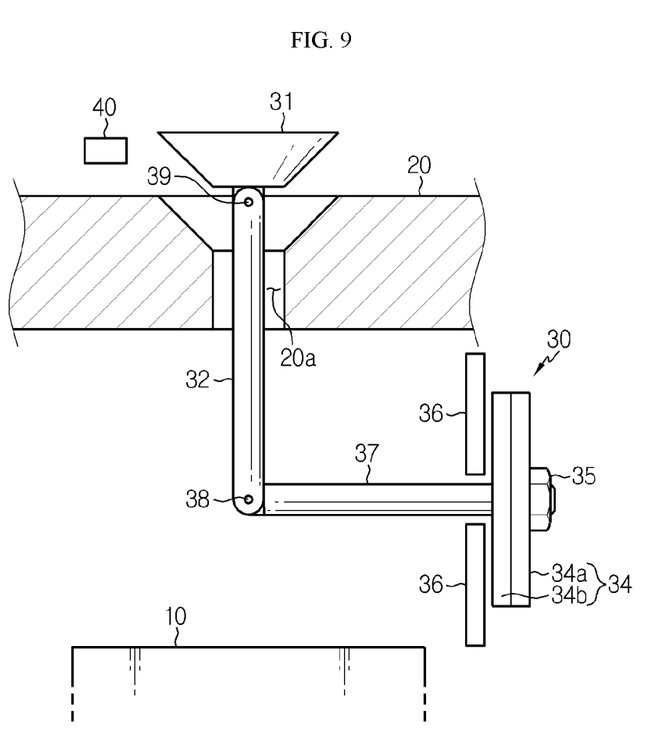
FIG. 9 is a diagram showing a battery pack according to still another embodiment of the present disclosure, different from the embodiment depicted in the above figures.
Figure 10:
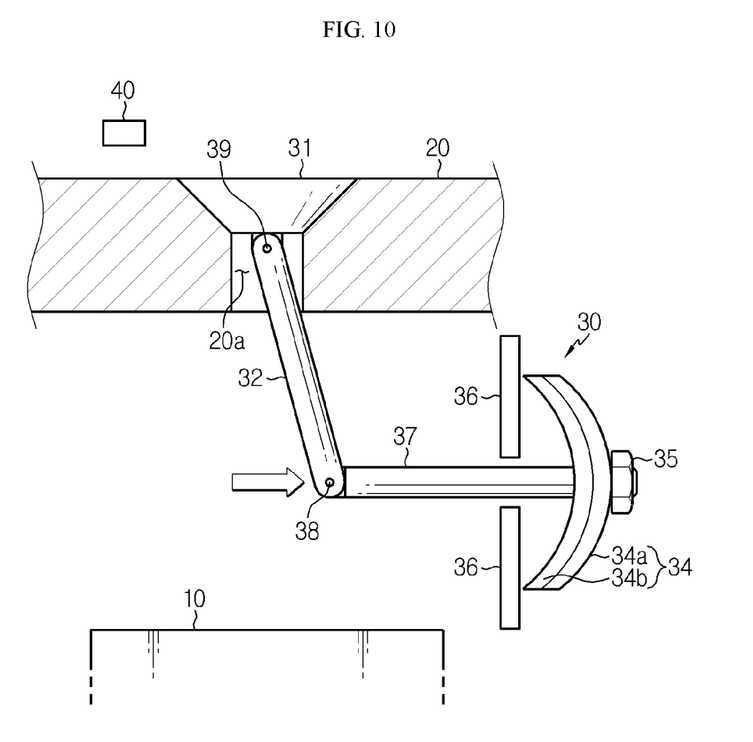
FIG. 10 is a diagram showing that the cooling hole is closed as the temperature rises, at the battery pack according to the embodiment depicted in FIG. 9.

FIG. 9 is a diagram showing a battery pack according to still another embodiment of the present disclosure, different from the embodiment depicted in the above figures, and FIG. 10 is a diagram showing that the cooling hole is closed as the temperature rises, at the battery pack according to the embodiment depicted in FIG. 9.

The battery pack according to the embodiment depicted in FIGS. 9 and 10 is substantially identical to that of the former embodiment depicted in FIG. 6, except that the horizontal rod 37 is applied to convert a horizontal force to a vertical force, and the rod joint 38 and the cap joint 39 are applied to facilitate the force direction conversion. Thus, in the description of the battery pack according to the embodiment depicted in FIGS. 9 and 10, the feature identical to the former embodiments will not be described in detail, and only a different feature will be described intensively.

Referring to FIGS. 9 and 10, in the battery pack according to still another embodiment of the present disclosure, one end of the horizontal rod 37 is fastened to the lower end of the vertical rod 32. At this time, the horizontal rod 37 and the vertical rod 32 may be fastened using the rod joint 38 so that the horizontal rod 37 and the vertical rod 32 may be pivotal relative to each other.

Meanwhile, the upper end of the vertical rod 32 is fastened to the hole cap 31. At this time, the vertical rod 32 and the hole cap 31 may also be fastened using the cap joint 39 so as to be pivotal relative to each other.

The horizontal rod 37 is a long rod-shaped component extending along a direction perpendicular to the extending direction of the vertical rod 32. When the bimetal 34 deforms its shape due to the temperature rise inside the pack case 20, the horizontal rod 37 is moved in a direction away from the vertical rod 32. If the horizontal rod 37 moves away from the vertical rod 32 as described above, the lower end of the vertical rod 32 also moves in the same direction, and accordingly the hole cap 31 pivotally coupled to the upper end of the vertical rod 32 is moved downward to close the cooling hole 20a.

As described above, in the battery pack according to still another embodiment of the present disclosure, due to the horizontal rod 37 connected and fixed to the second bimetal 34, it is possible to close the cooling hole 20a by converting a horizontal force into a vertical direction, thereby minimizing the space between the cooling hole 20a and the battery cell 10. Thus, it is possible to increase the energy density of the battery pack.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:
   at least one battery cell;
   a pack case configured to accommodate the at least one battery cell and having a cooling hole formed therethrough;
   an air flow meter outside the pack case and disposed adjacent to and downstream of the cooling hole;
   an opening and closing unit configured to close the cooling hole according to a temperature inside the pack case exceeding a reference temperature; and
   an alarm device configured to generate an alarm when the air flow meter senses that the flow of air is blocked.

2. The battery pack according to claim 1, wherein the air flow meter senses flow of air that flows from inside of the pack case to outside of the pack case.

3. A battery pack, comprising:
   at least one battery cell;
   a pack case configured to accommodate the at least one battery cell and having a cooling hole formed therethrough;
   an air flow meter provided at an outer side of the pack case and disposed adjacent to the cooling hole; and
   an opening and closing unit configured to close the cooling hole according to a temperature inside the pack case exceeding a reference temperature,
   wherein the opening and closing unit includes:
   a hole cap having a size and shape corresponding to the cooling hole;
   a vertical rod connected to the hole cap; and
   at least one bimetal configured to deform in shape when the temperature inside the pack case rises over the reference temperature so that the vertical rod is moved downward, whereby the hole cap is moved downward to close the cooling hole.

4. The battery pack according to claim 3, wherein the at least one bimetal includes:
   a first bimetal curved to be convex upward when the temperature rises, the first bimetal having a perforation hole through which the vertical rod is provided; and
   a second bimetal located below the first bimetal and coupled to the vertical rod, the second bimetal being curved to be convex downward when the temperature rises,
   wherein the opening and closing unit further includes a stopper located above the first bimetal to restrict the upward movement of the first bimetal.

5. The battery pack according to claim 4, wherein the opening and closing unit further includes:
   an elastic member located below the second bimetal to elastically support the second bimetal upward.

6. The battery pack according to claim 3, wherein the at least one bimetal includes one bimetal coupled to the vertical rod and curved to be convex downward when the temperature rises, and
   wherein the opening and closing unit further includes a stopper located above the one bimetal to restrict the upward movement of the one bimetal.

7. The battery pack according to claim 3, wherein the opening and closing unit further includes:
   a horizontal rod extending in a direction perpendicular to the vertical rod and having a first end connected to an end of the vertical rod,
   wherein the horizontal rod is moved in a direction away from the vertical rod, whereby the hole cap connected to the vertical rod is moved downward to close the cooling hole.

8. The battery pack according to claim 7, wherein the at least one bimetal includes:

a first bimetal curved to be convex toward the vertical rod when the temperature rises, the first bimetal having a perforation hole through which the horizontal rod is provided;

a second bimetal located adjacent to the first bimetal and fixed to the other end of the horizontal rod provided through the perforation hole, and wherein the opening and closing unit further includes a stopper located between the vertical rod and the first bimetal to restrict the movement of the first bimetal toward the vertical rod.

9. The battery pack according to claim 8, wherein the opening and closing unit further includes an elastic member configured to elastically support the second bimetal toward the first bimetal.

10. The battery pack according to claim 7, wherein the at least one bimetal includes one bimetal coupled to the other end of the horizontal rod and curved to be convex in a direction away from the vertical rod when the temperature rises, and wherein the opening and closing unit further includes a stopper located between the vertical rod and the one bimetal to restrict the movement of the one bimetal toward the vertical rod.

11. A battery pack, comprising:

at least one battery cell;

a pack case configured to accommodate the battery cell and having a cooling hole formed therethrough;

a flow meter provided at an outer side of the pack case and disposed adjacent to the cooling hole;

a hole cap having a size and shape corresponding to the cooling hole;

a vertical rod connected to the hole cap; and at least one bimetal configured to deform in shape when the temperature inside the pack case rises over a reference temperature so that the vertical rod is moved downward, whereby the hole cap is moved downward to close the cooling hole.

12. The battery pack according to claim 11, further comprising:

a horizontal rod extending in a direction perpendicular to the vertical rod and having a first end connected to a first end of the vertical rod, wherein a second end of the vertical rod connects to the hole cap;

wherein the horizontal rod is moved in a direction away from the vertical rod, whereby the hole cap connected to the vertical rod is moved downward to close the cooling hole when the at least one bimetal deforms in shape.

\* \* \* \* \*